(12) United States Patent
Kobayashi (10) Patent No.: US 9,247,123 B2
(45) Date of Patent: Jan. 26, 2016

(54) IMAGING APPARATUS

(71) Applicant: Panasonic Corporation, Osaka (JP)

(72) Inventor: Kuniyoshi Kobayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/049,343

(22) Filed: Oct. 9, 2013

(65) Prior Publication Data

US 2014/0104485 A1    Apr. 17, 2014

(30) Foreign Application Priority Data

Oct. 12, 2012  (JP) .................................. 2012-226582

(51) Int. Cl.
*H04N 5/232* (2006.01)
*H04N 5/225* (2006.01)
*G03B 17/00* (2006.01)

(52) U.S. Cl.
CPC ....... *H04N 5/23212* (2013.01); *H04N 5/23219* (2013.01)

(58) Field of Classification Search
CPC .......... H04N 5/23212; H04N 5/23219; H04N 5/23216; H04N 5/144; H04N 5/145; G06K 9/00221; G02B 7/36
USPC ...................... 348/169, 352, 357, 345, 222.1; 396/79–83
See application file for complete search history.

(56) References Cited

U.S. PATENT DOCUMENTS

| 6,967,686 | B1* | 11/2005 | Tanaka | 348/352 |
| 8,330,849 | B2 | 12/2012 | Ishii | |
| 8,497,929 | B2 | 7/2013 | Ishii | |
| 2005/0285967 | A1* | 12/2005 | Suda | H04N 5/23212 348/345 |
| 2007/0019940 | A1* | 1/2007 | Sasaki | G02B 7/28 396/121 |
| 2007/0187571 | A1* | 8/2007 | Ebe et al. | 250/201.2 |
| 2008/0158408 | A1* | 7/2008 | Asano | 348/348 |
| 2008/0240700 | A1* | 10/2008 | Takagi | G03B 13/32 396/98 |
| 2009/0190910 | A1* | 7/2009 | Yasuda | H04N 5/23212 396/133 |
| 2010/0097515 | A1 | 4/2010 | Ishii | |
| 2010/0201835 | A1* | 8/2010 | Onoda | 348/222.1 |
| 2010/0289940 | A1* | 11/2010 | Toguchi | H04N 5/23212 348/345 |
| 2011/0292272 | A1* | 12/2011 | Terashima et al. | 348/345 |
| 2013/0038780 | A1 | 2/2013 | Ishii | |

FOREIGN PATENT DOCUMENTS

| JP | 2-813 | 1/1990 |
| JP | 2010-50746 | 3/2010 |
| JP | 2010-102041 | 5/2010 |

* cited by examiner

*Primary Examiner* — Sinh Tran
*Assistant Examiner* — Xi Wang
(74) *Attorney, Agent, or Firm* — Panasonic Patent Center (57) ABSTRACT

An imaging apparatus includes an imaging unit configured to capture an image, a subject detector configured to detect a subject from the image captured by the imaging unit, a setting unit configured to set, in accordance with a change of a position of the subject detected by the subject detector, an image region to be focused on for the changed position of the subject, a focus unit configured to perform a focus operation to the subject included in the set image region, and a controller configured to control a speed of the focus operation according to a moving speed of the subject detected by the subject detector.

5 Claims, 6 Drawing Sheets

IMAGING APPARATUS

BACKGROUND

1. Technical Field

The present disclosure relates to an imaging apparatus which performs a focus operation.

2. Related Art

JP 2010-102041 A discloses an imaging apparatus which detects a focus point in shooting a person. When a face is detected in a captured image, the imaging apparatus sets stability determination time to determine whether the face is stably recognized, and starts to measure time. The imaging apparatus obtains an AF (auto-focus) evaluation value based on whether the measured time exceeds the stability determination time, and performs TV-AF control. Accordingly, it is possible to stably detect a focus point in shooting a person.

SUMMARY

The present disclosure provides an imaging apparatus which is effective in performing a stable focus operation according to a moving speed of a subject.

The imaging apparatus according to the present disclosure includes an imaging unit configured to capture an image, a subject detector configured to detect a subject from the image captured by the imaging unit, a setting unit configured to set, in accordance with a change of a position of the subject detected by the subject detector, an image region to be focused on for the changed position of the subject, a focus unit configured to perform a focus operation to the subject included in the set image region, and a controller configured to control a speed of the focus operation according to a moving speed of the subject detected by the subject detector.

The imaging apparatus according to the present disclosure is effective in performing a stable focus operation according to a moving speed of a subject. For example, the imaging apparatus according to the present disclosure is effective in performing a stable focus operation when the moving speed of the subject is fast.

BRIEF DESCRIPTION OF DRAWINGS

FIG. 1A and FIG. 1B are schematic views for describing focusing on a background due to movement of a subject, where FIG. 1A shows a face detecting frame and an AF detection area when the subject is still, and FIG. 1B shows a face detecting frame and an AF detection area when the subject is moving.

FIG. 3A and FIG. 3B are schematic views for describing the AF detection area, where FIG. 3A shows the AF detection area in an ordinary moving-image shooting mode, and FIG. 3B shows the AF detection area in a face detecting mode.

FIGS. 6A and 6B are schematic views for describing AF control, where FIG. 6A shows a relationship between a change amount of a face-detected position and a set value of a sampling interval of AF control, and FIG. 6B shows a timing of performing the AF control.

DETAILED DESCRIPTION OF PREFERRED EMBODIMENTS

Hereinafter, embodiments will be described in detail with reference to the drawings as necessary. Note that a detailed description more than necessary may be omitted. For example, a detailed description of an already-known matter and a repeated description of substantially the same configuration may be omitted. This is for the purpose of avoiding an unnecessarily redundant description, and for facilitating the understanding of persons skilled in the art.

Note that the inventors provide the attached drawings and the following descriptions so that the persons skilled in the art can fully understand the present disclosure, and the subject matters described in the claims are not limited by these drawings and the descriptions.

First Embodiment

A first embodiment will be described with reference to the drawings. In the first embodiment, the imaging apparatus of the present disclosure is applied to a digital video camera which captures a moving image.

1-1. Summary

The digital video camera according to the first embodiment includes a subject detecting function for detecting a subject (in the present embodiment, a face detecting function for detecting a face) from a captured image. In a face detecting mode for detecting the face of the subject from the captured image, the digital video camera performs a focus operation based on an image of a region (AF detection area) set based on face-detected position information obtained by the face detecting function.

When a moving speed of the subject is fast, a detecting process of detecting the subject (for example, the face) and a focus process of focusing on the detected subject cannot follow the moving speed of the subject in some cases. In this case, a detected position of the subject is displaced from an actual position of the subject during the focus operation. For example, a background of the subject is focused, and therefore, a stable focus operation becomes difficult.

Considering the above problem, in the first embodiment, there is described a configuration of the digital video camera in which occurrence of focusing on the background due to movement of the subject is reduced, and a stable focus operation can be performed even when the moving speed of the subject is fast.

First, a problem of focusing on the background due to the movement of the subject will be described with reference to FIGS. 1A and 1B.

Figure 1A:
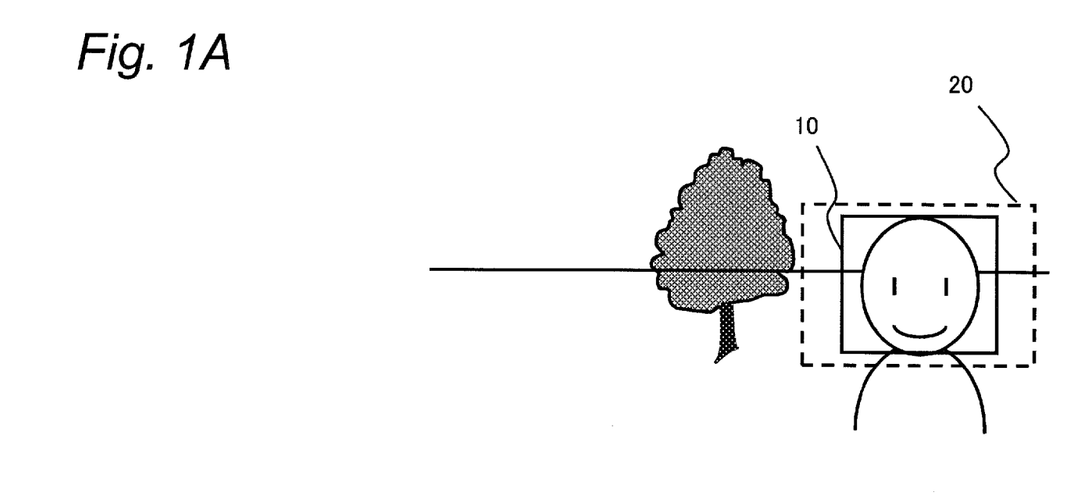

FIG. 1A is a view for describing a focus operation when a person as the subject is still. At the time of shooting a moving image in the face detecting mode, the digital video camera analyzes whether a captured image frame includes a feature of a face. When the captured image frame includes a feature of the face, the digital video camera sets a face detecting frame 10 so as to surround the detected face. Thereafter, the digital video camera sets an AF wave detecting area 20 wider than the face detecting frame 10, with a position of the detected face as the center. A face detecting process and a setting process of the AF detection area requires a suitable processing time. In the example shown in FIG. 1A, because the subject is still, the position of the subject does not change even if the face detecting process and the AF detection area setting process require time. Therefore, influence of a delay in the face detecting process is extremely small. That is, as shown in FIG. 1A, the face of the still subject remains in the set AF detection area 20 when the face detecting process and the AF detection area setting process are performed. Accordingly, the actual position of the face is focused.

Figure 1B:
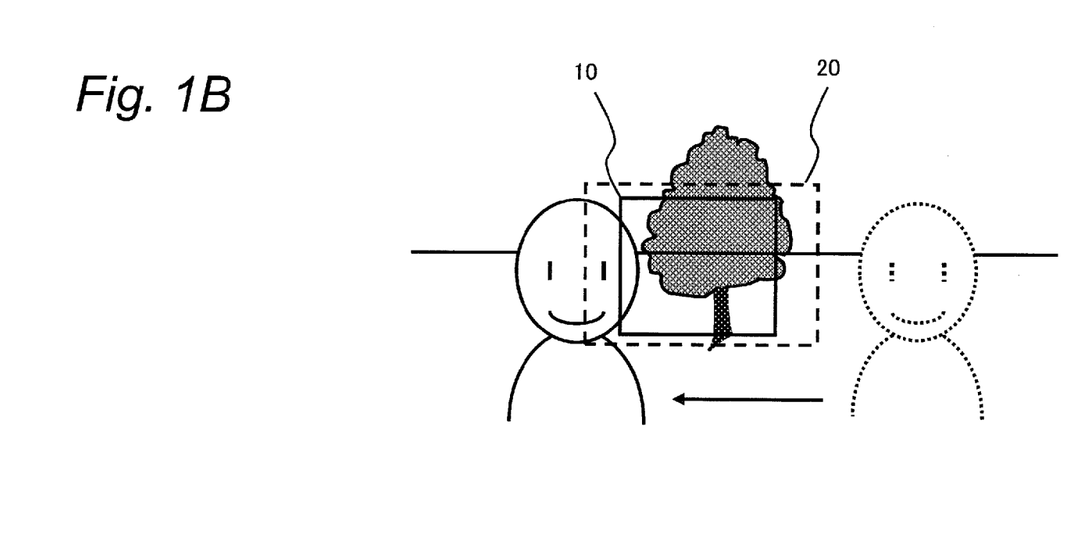

On the other hand, FIG. 1B is a view for describing the focus operation when the person as the subject moves from right to left at a high speed in the drawing. In the example shown in FIG. 1B, because the subject moves in the right-left direction, the focus operation receives the influence of delay in the face detecting process. Specifically, as the moving speed of the subject is increased, the face detecting process and the AF detection area setting process cannot follow the moving speed of the subject. Therefore, as shown in FIG. 1B, when the face detecting process and the setting process of the AF detection area are completed, the subject has already moved to a position greatly away from the center of the AF detection area 20. As a result, there occurs a problem that the focus operation is performed on the background.

To solve this problem, the digital video camera according to the first embodiment controls the speed of the focus operation according to the moving speed of the subject. Specifically, when the moving speed of the detected subject is fast, the digital video camera controls the focus operation to be slow as compared to the case where the moving speed of the detected subject is slow. Accordingly, a stable focus operation is realized even when the moving speed of the subject is fast.

Hereinafter, a configuration and an operation of the digital video camera according to the present embodiment are described in detail with reference to the drawings.

1-2. Configuration of Digital Video Camera

Figure 2:
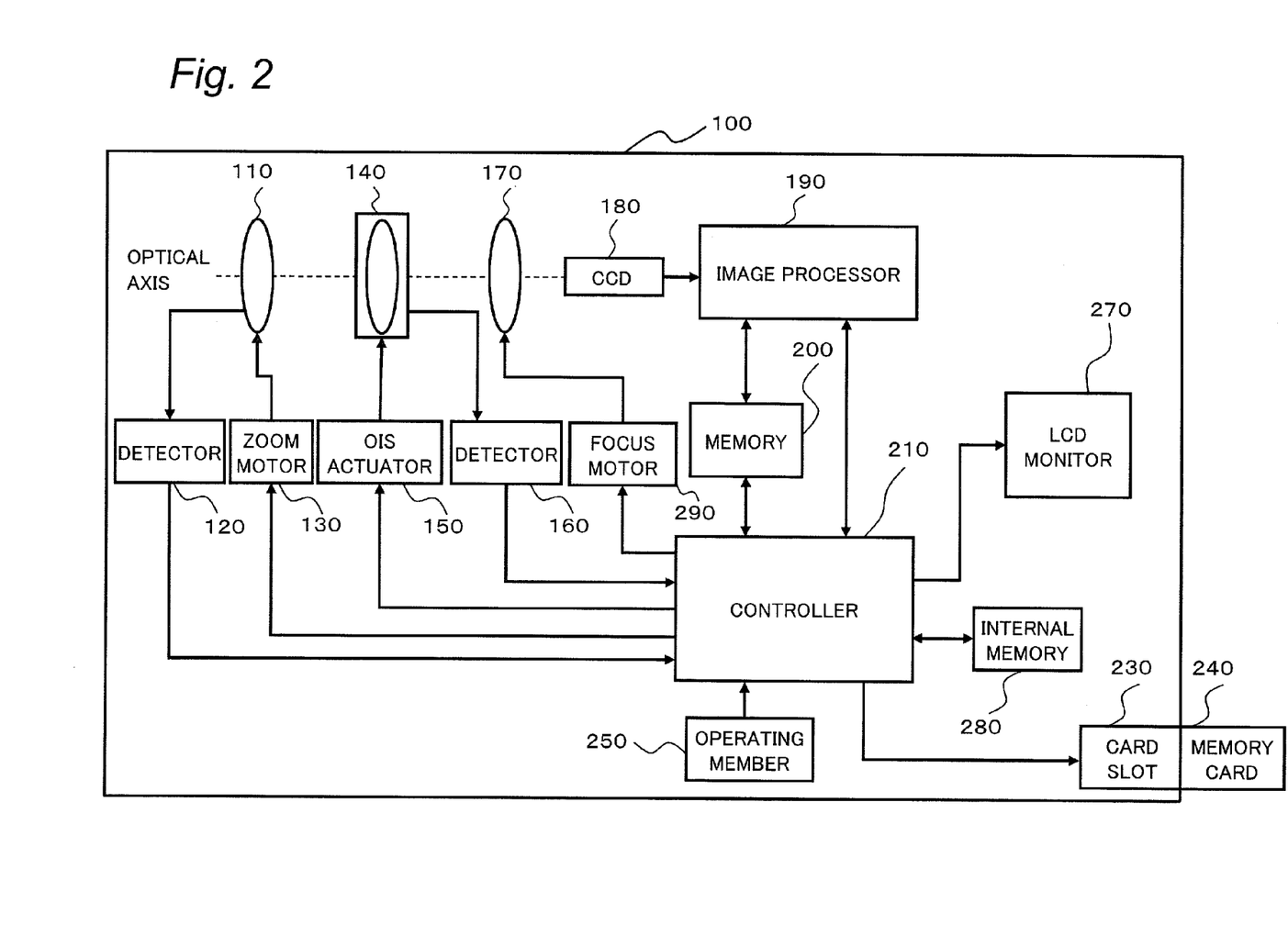
FIG. 2 is a block diagram showing a configuration of a digital video camera according to a first embodiment.

FIG. 2 shows an electrical configuration of the digital video camera according to the present embodiment. A digital video camera 100 according to the present embodiment captures, with a CCD image sensor 180, a subject image formed by an optical system including a zoom lens 110. Video image data generated by the CCD image sensor 180 is processed by an image processor 190, and stored in a memory card 240. The video image data stored in the memory card 240 can be displayed in a liquid crystal display (LCD) monitor 270. Hereinafter, a configuration of the digital video camera 100 will be described in detail.

The optical system of the digital video camera 100 includes the zoom lens 110, an OIS (Optical Image Stabilizer) 140, and a focus lens 170. The zoom lens 110 can enlarge or reduce the subject image by moving along the optical axis of the optical system. The focus lens 170 adjusts a focus of the subject image by moving along the optical axis of the optical system. A focus motor 290 drives the focus lens 170.

The OIS 140 includes therein a correction lens which can be moved in a plane perpendicular to the optical axis. The OIS 140 reduces a blur of the subject image by driving the correction lens in a direction of canceling the shake of the digital video camera 100.

A zoom motor 130 drives the zoom lens 110. The zoom motor 130 may be realized by a pulse motor, a DC motor, a linear motor, or a servo motor. The zoom motor 130 may be configured to drive the zoom lens 110 via a cam mechanism or a mechanism such as a ball screw. A detector 120 detects a position of the zoom lens 110 on the optical axis. In accordance with movement of the zoom lens 110 in the optical axis direction, the detector 120 outputs a signal related to a position of the zoom lens 110 by a switch such as a brush.

An OIS actuator 150 drives the correction lens in the OIS 140 in a plane perpendicular to the optical axis. The OIS actuator 150 can be realized by a planar coil or an ultrasonic motor. A detector 160 detects a moving amount of the correction lens in the OIS 140.

The CCD image sensor 180 captures a subject image formed by the optical system including the zoom lens 110, and generates a captured image (i.e., video image data). The CCD image sensor 180 performs various operations such as exposure, transfer, and electronic shutter.

The image processor 190 performs various processes to the video image data generated by the CCD image sensor 180, generates video image data to be displayed in the liquid crystal display monitor 270, and generates video image data to be stored in the memory card 240. For example, the image processor 190 performs various processes such as gamma correction, white balance correction, and flaw correction to the video image data generated by the CCD image sensor 180. The image processor 190 compresses the video image data generated by the CCD image sensor 180 in a compression form based on, for example, the H. 264 standard or the MPEG-2 standard. The image processor 190 can be realized by a DSP (Digital Signal Processor) or a microcomputer.

A controller 210 is a control unit which controls the entire digital video camera 100. The controller 210 can be realized by a semiconductor element or the like. The controller 210 may be configured by only hardware or may be realized by combining hardware and software. The controller 210 can be realized by a microcomputer and the like.

A memory 200 functions as a work memory of the image processor 190 and the controller 210. The memory 200 can be realized by a DRAM or a ferroelectric memory.

The liquid crystal display monitor 270 can display an image shown by the video image data generated by the CCD image sensor 180 and an image shown by the video image data read from the memory card 240.

The memory card 240 can be attached to and detached from a card slot 230. The card slot 230 can be mechanically and electrically connected to the memory card 240. The memory card 240 includes therein a flash memory or a ferroelectric memory, and can store data.

An internal memory 280 is configured by a flash memory, a ferroelectric memory, and the like. The internal memory 280 stores a control program and the like to control the entire digital video camera 100.

An operating member 250 is a member which accepts the operation from the user.

1-3. Contrast AF (Autofocus) Operation

The digital video camera 100 according to the present embodiment includes the ordinary moving-image shooting mode and the face detecting mode, and performs a contrast AF according to each mode.

Figure 3A:
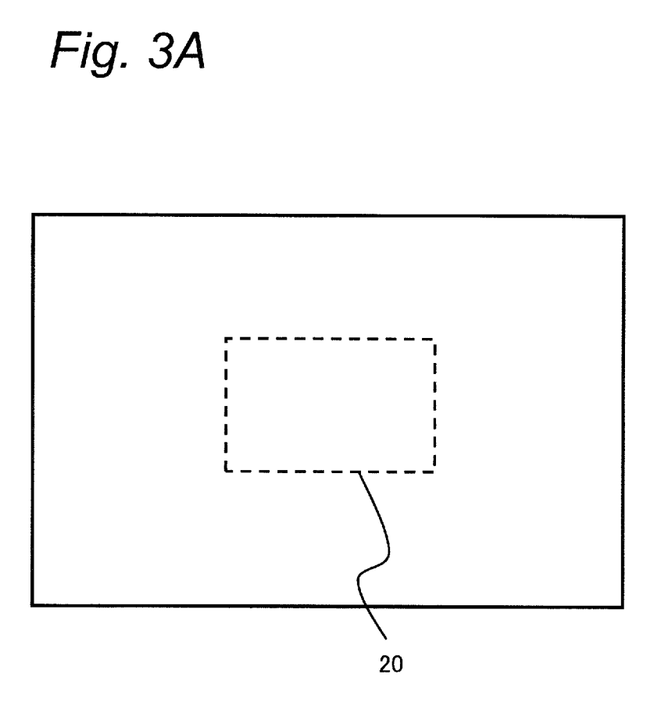

First, the contrast AF in the ordinary moving-image shooting mode will be described with reference to FIG. 3A. In the ordinary moving-image shooting mode, the digital video camera 100 performs a contrast AF by using an image in a predetermined region of a captured image. In the ordinary moving-image shooting mode, a setting position of the AF detection area is determined in advance. For example, as shown in FIG. 3A, in the ordinary moving-image shooting mode, the digital video camera 100 sets a center portion of the captured image as an AF detection area 20. The controller 210 calculates an AF evaluation value based on a brightness value of the image in the AF detection area 20. The controller 210 moves the focus lens 170 by controlling the focus motor 290 to maximize the AF evaluation value. This is the contrast AF in the ordinary moving-image shooting mode.

Figure 3B:
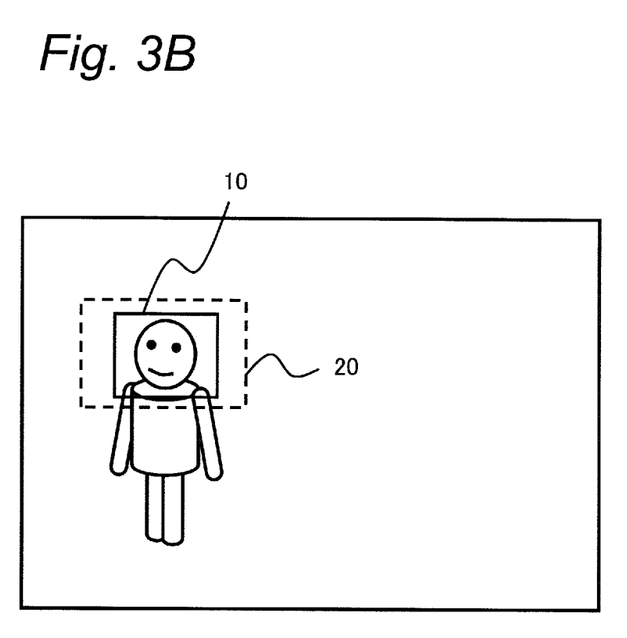

Next, a contrast AF in the face detecting mode will be described with reference to FIG. 3B. In the face detecting mode, the digital video camera 100 sets the AF detection area 20 based on face-detected position information obtained by the face detecting function. Specifically, when shooting a moving image, the controller 210 analyzes whether the captured image frame includes a feature of the face. When the captured image frame includes a feature of the face, the controller 210 obtains center coordinate information of the detected face as face-detected position information, and sets the face detecting frame 10 so as to surround the detected face. Thereafter, as shown in FIG. 3B, based on the face-detected position information obtained by the face detecting function, the controller 210 sets as the AF detection area 20 a wider range including the face detecting frame 10 with a position of the detected face as the center. The digital video camera 100 calculates the AF evaluation value for the face detecting mode in the set AF detection area 20. The controller 210 moves the focus lens 170 by controlling the focus motor 290 to maximize the AF evaluation value. This is the contrast AF in the face detecting mode.

1-4. AF Control in Face Detecting Mode

Figure 4:
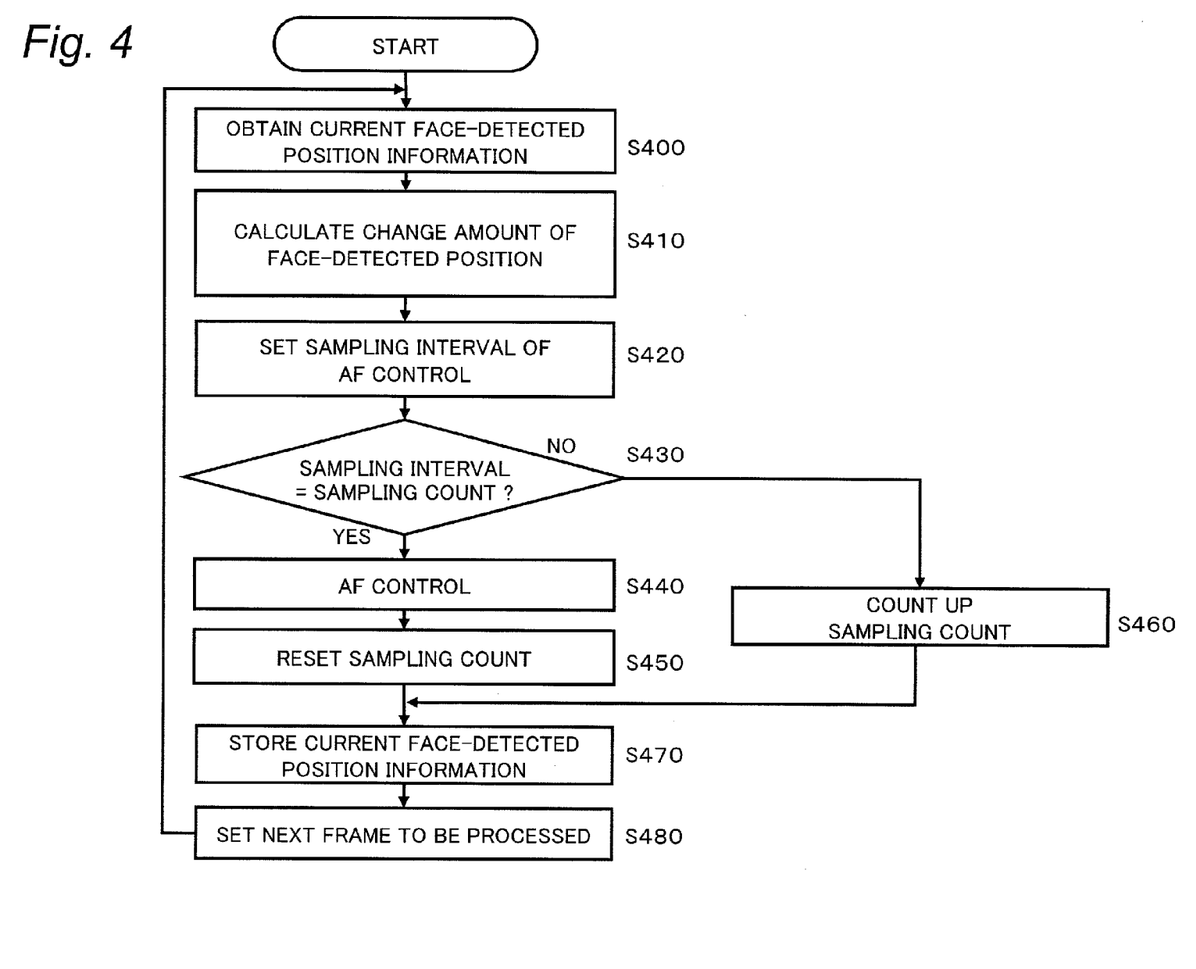
FIG. 4 is a flowchart for describing the operation of AF control of the digital video camera in the first embodiment.

The AF control in the face detecting mode will be described more specifically with reference to FIGS. 4 to 6B. FIG. 4 shows a flowchart of the AF control in the face detecting mode.

In the face detecting mode, the controller 210 obtains face-detected position information from a captured image frame to be currently processed (S400). Specifically, the controller 210 detects a face by analyzing whether or not an average feature of a face is in the captured image frame. The controller 210 obtains center coordinate information of the detected face as face-detected position information.

When the face-detected position information is obtained from the currently-processed captured image frame, the controller 210 compares the face-detected position information obtained from the currently-processed captured image frame with the face-detected position information obtained from the captured image frame processed N (N is an integer equal to or larger than 1) frames before, and calculates a change amount of the face-detected position information per unit time (the moving speed of the subject) (S410).

Figure 5:
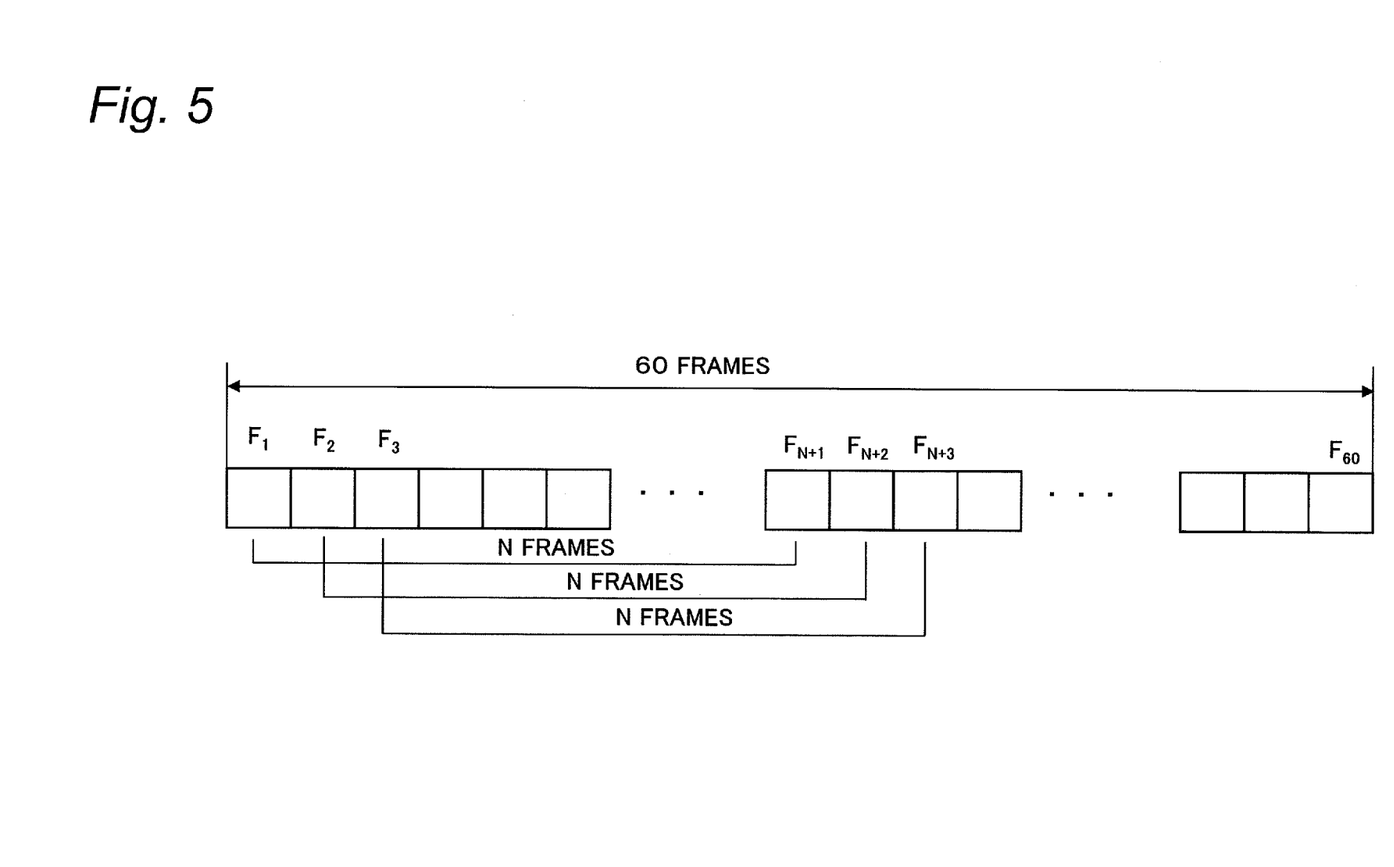
FIG. 5 is a schematic view for describing a face-detected-position-information change amount in the face detecting mode.

Details of the calculation of the change amount of the face-detected position information (S410) will be described with reference to FIG. 5. In the present embodiment, the face-detected position information is obtained at the interval of N frames. For example, as shown in FIG. 5, when the currently-processed captured image frame is a frame $F_{N+1}$ the controller 210 calculates a change amount of the face-detected position from a frame $F_1$ which is N frames before the frame $F_{N+1}$. Similarly, when the currently-processed captured image frame is a frame $F_{N+2}$, the controller 210 calculates a change amount of the face-detected position from a frame $F_2$ which is N frames before the frame $F_{N+2}$.

As described above, the controller 210 calculates a change amount of the face-detected position (i.e., a moving amount of the detected face of the subject) during a time required for capturing N frames. For example, in the case of obtaining the face-detected position information at a 5-frame interval (N=5) when capturing at 60 fps, a moving amount of the detected face is calculated during a time (about 80 msec (5/60 sec)) required for capturing 5 frames. Because the moving amount of the subject is calculated at the N-frame interval, when a frame which has failed to detect a face is included, the controller 210 uses a result calculated in frames before and after the failed frame. Because information can be compensated for in this manner, a stable operation can be performed.

Referring back to FIG. 4, after calculating the change amount of the face-detected position information per unit time (S410), the controller 210 sets the sampling interval of AF control, based on the calculated change amount of the face-detected position information per unit time (S420). At this time, the controller 210 sets the sampling interval of AF control longer as the change amount of the face-detected position is larger, and sets the sampling interval of AF control shorter as the change amount of the face-detected position is smaller.

Figure 6A:
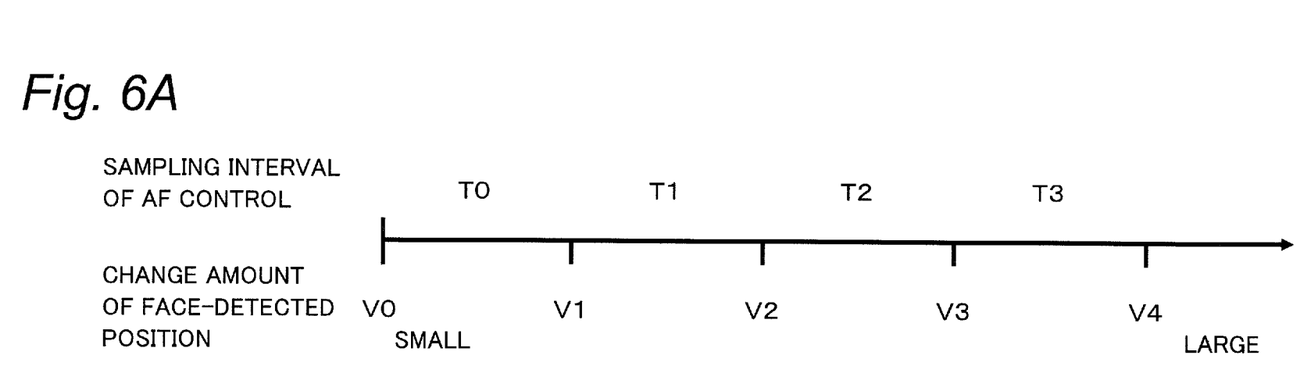
Figure 6B:
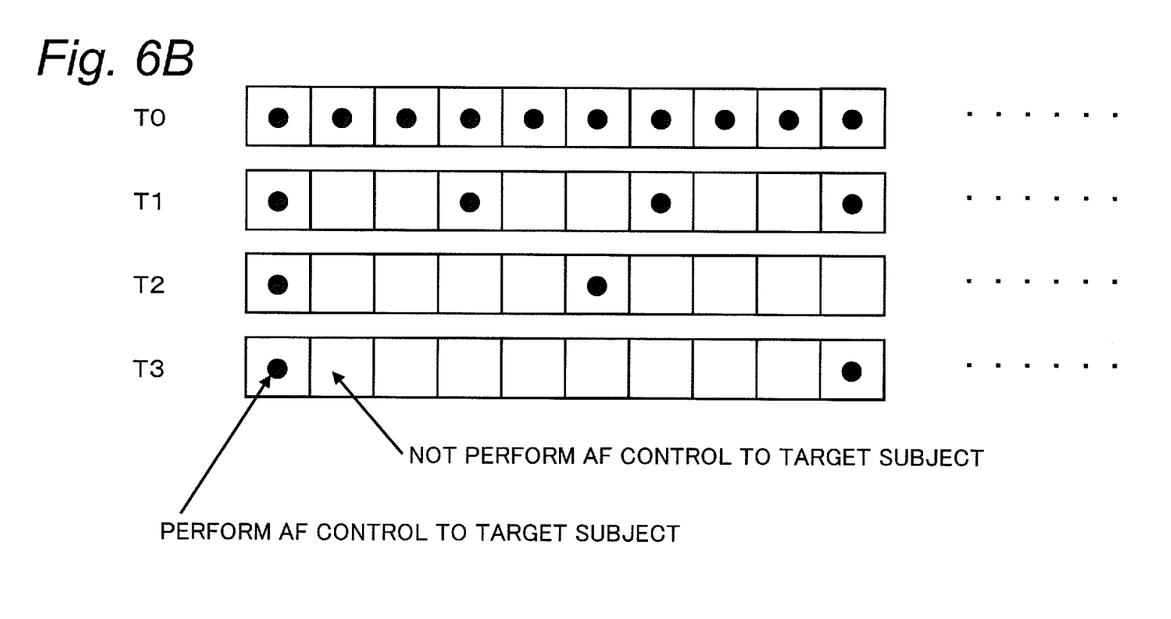

Details of the setting of the sampling interval of AF control (S420) will be described with reference to FIGS. 6A and 6B. FIG. 6A is a diagram showing a relationship between a change amount of the face-detected position and a set value of the sampling interval of AF control. FIG. 6B is a diagram showing a timing of performing the AF control.

As shown in FIG. 6A, when the change amount of the face-detected position is small, i.e., V0 to V1, the controller 210 sets a sampling interval of AF control T0. As shown in FIG. 6B, the sampling interval of AF control T0 is 0 frames. This means that the AF control is performed for each frame. When the change amount of the face-detected position is V1 to V2, the controller 210 sets a sampling interval of AF control T1. The sampling interval of AF control T1 is 2 frames. This means that the AF control is performed every 3 frames. When the change amount of the face-detected position is V2 to V3, the controller 210 sets a sampling interval of AF control T2. The sampling interval of AF control T2 is 4 frames. This means that the AF control is performed every 5 frames. When the change amount of the face-detected position is large, i.e., V3 to V4, the controller 210 sets a sampling interval of AF control T3. The sampling interval of AF control T3 is 8 frames. This means that the AF control is performed every 9 frames. In this manner, the controller 210 sets the sampling interval of AF control longer as the change amount of the face-detected position is larger, and sets the sampling interval of AF control shorter as the change amount of the face-detected position is smaller.

Referring back to FIG. 4, after setting the sampling interval of AF control (S420), the controller 210 compares the set sampling interval of AF control with a count value of a counter prepared for measuring the timing to perform the AF control (S430). Only when the set sampling interval of AF control matches the count value (YES at S430, at the timing indicated by • in FIG. 6B), the controller 210 performs the AF control (S440). The AF control refers to a process of driving the focus lens 170 by a predetermined amount from a focus lens position where the focus lens 170 is located at the time point of the currently-processed captured image frame, to a focus direction (direction of focusing on a target subject) determined based on the AF evaluation value (contrast value) obtained from the set AF detection area. After performing the AF control, the controller 210 resets the count value of the counter to zero (S450). On the other hand, when the set AF sampling interval does not match the count value of the counter (NO at S430, at the timing not indicated by • in FIG. 6B), the controller 210 only counts up the count value of the counter (S460), and does not perform the AF control.

Thereafter, the controller 210 stores the face-detected position information obtained from the currently-processed captured image frame (S470). Accordingly, when the captured image frame after N frames is to be processed, the controller 210 can calculate a change amount of the face-detected position information by using the face-detected position information stored this time.

Thereafter, the controller 210 sets the next frame to be processed (S480), and again performs the process in step S400 and subsequent steps. A series of processes (processes in S400 to S480) are repeatedly performed by the controller 210 until the face detecting mode ends.

As described above, the controller 210 sets the sampling interval of AF control longer as the change amount of the face-detected position is larger, and sets the sampling interval of AF control shorter as the change amount of the face-detected position is smaller. That is, the controller 210 sets the sampling interval of AF control longer as the moving speed of the subject is faster, and sets the sampling interval of AF control shorter as the moving speed of the subject is slower. This means that the controller 210 changes a speed of the AF control according to the moving speed of the subject. With this configuration, even when the AF detection area 20 (focus detecting frame) cannot instantly follow the moving speed of the subject, it is possible to reduce the frequency of performing the AF control on the region where the face is not present (such as the background) as a target subject, and erroneously focusing on the background as the target subject. In other words, when the subject moves a large distance, the focus operation is not promptly performed, and therefore, focusing on the region where the face is not present is reduced.

1-5. Effects

The digital video camera 100 (an imaging apparatus) according to the present embodiment includes an imaging unit (the CCD image sensor 180) which captures a subject image to generate a captured image, a subject detector (the controller 210) which detects a subject (a face in the present embodiment) from an image based on the captured image, a setting unit (controller 210) which sets, in accordance with a change of a position of the subject detected by the subject detector, an image region to be focused for the changed position of the subject, a focus unit (the focus motor 290 and the controller 210) which performs a focus operation to the subject included in the set image region, and a controller (the controller 210) which controls a speed of the focus operation according to a moving speed of the detected subject. With this configuration, the digital video camera 100 according to the present embodiment can perform a stable focus operation according to the moving speed of the subject.

That is, the CCD image sensor 180 captures a subject image and generates video image data. In the face detecting mode, the controller 210 detects the subject (a face in the present embodiment) from the video image data. The controller 210 sets the AF detection area 20 based on a position of the detected subject. Further, the controller 210 controls the speed of the focus operation according to a change amount of a position of the face of the detected subject (moving speed of the subject). Specifically, when the moving speed of the detected subject is fast, the controller 210 controls the focus operation to be slow as compared with when the moving speed of the detected subject is slow. That is, the controller 210 sets the sampling interval of AF control longer as the change amount of the face-detected position is larger (when the moving speed of the subject is faster), and sets the sampling interval of AF control shorter as the change amount of the face-detected position is smaller (when the moving speed of the subject is slower). The focus motor 290 and the controller 210 perform the focus operation to the subject included in the AF detection area 20, based on the set sampling interval of AF control. With this configuration, even when the AF detection area 20 cannot instantly follow the moving speed of the subject, it is possible to reduce the frequency of performing the AF control on the region where the face is not present (such as the background) as a target subject, and erroneously focusing on the background as the target subject. The digital video camera 100 according to the first embodiment can thus perform a stable focus operation even when the moving speed of the subject is fast.

Other Embodiments

As described above, the first embodiment has been described as an illustration of the technique disclosed in the present application. However, the technique in the present disclosure is not limited to the first embodiment, and can also be applied to an embodiment in which change, replacement, addition, and deletion are suitably performed. Further, constituent elements described in the first embodiment can be combined to provide a new embodiment.

Hereinafter, other embodiments will be illustrated. These other embodiments are non-exhaustive examples of the possible embodiments which can implement the novel technique described in the present application.

The optical system and a drive system of the digital video camera 100 according to the first embodiment are not limited to those shown in FIG. 2. For example, although FIG. 2 illustrates an optical system of 3-group configuration, the optical system may have a lens configuration of other group. Further, each lens may be configured by one lens or by a lens group including a plurality of lenses.

Further, although the CCD image sensor 180 is illustrated as the imaging unit in the first embodiment, the imaging unit only needs to be a unit which captures a subject image and generates a captured image. Therefore, the imaging unit is not limited to the CCD image sensor 180. For example, the imaging unit may be a CMOS image sensor or an NMOS image sensor.

The control of the speed of the focus operation in the first embodiment (FIG. 4) is performed by the digital video camera 100 having the face detecting function, according to the change amount of the face detected position. However, the control standard of the speed of the focus operation in the present disclosure is not limited to the change amount of the face detected position. Therefore, the control of the speed of the focus operation in the present disclosure can be performed according to a change of a predetermined target in the captured image. For example, control of the speed of the focus operation in the present disclosure may be performed to a color trace function of tracing a color contained in the captured image or to a moving-body detecting function of detecting a moving body in the captured image. For example, although a face of a person is detected in the first embodiment, the present disclosure can also be applied to detection of a moving subject such as an animal (for example, a pet) and a vehicle (for example, a car).

In the first embodiment, the controller 210 obtains the center coordinate information of the detected face as the face-detected position information. However, the face-detected position information is not limited to the center coordinate information of the face. Therefore, the face-detected position information may be coordinate information of an end part of the detected face.

In the first embodiment, the sampling interval of AF control which is changed according to a moving speed of the subject is set in stages of T0 to T3 shown in FIG. 6A according to the change amounts V0 to V4 of the face-detected position. However, the sampling interval of AF control is not required to be set in stages. For example, the sampling interval of AF control may be continuously changed according to the moving speed of the subject.

The controller 210 may stop the AF control when the moving speed of the subject exceeds a first predetermined reference speed. That is, when the moving speed of the subject exceeds the first predetermined reference speed, the sampling interval of AF control may be set infinite. At this time, when the moving speed of the subject returns to a second predetermined reference speed or lower, the AF control may be restarted. That is, when the moving speed of the subject returns to the second predetermined reference speed or lower, in step S420 in FIG. 4, the sampling interval of AF control may be returned to T0 (0 frame), T1 (2 frames), T2 (4 frames) or T3 (8 frames), for example, based on the change amount of the face-detected position.

In the first embodiment, as an example of slowly controlling the focus operation, a case has been described in which the sampling interval of AF control is changed according to the moving speed of the subject. However, a method of controlling the speed of the focus operation is not limited to the change of the sampling interval of AF control. For example, as a method of controlling the speed of the focus operation, a moving amount of the focus lens 170 moved by one sampling may be changed according to the moving speed of the subject. Specifically, as a moving speed of the subject is faster, the moving amount of the focus lens 170 moved by one sampling is changed to become smaller. Further, when a moving speed of the subject is slower, the moving amount of the focus lens 170 moved by one sampling is changed to become larger. With this configuration, even when the AF detection area 20 (focus detecting frame) cannot instantly follow the moving speed of the subject, it is possible to reduce the frequency of performing the AF control on the region where the face is not present (such as the background) as a target subject, and erroneously focusing on the background as the target subject.

In the above embodiment, the digital video camera 100 is an example of the imaging apparatus. The CCD image sensor 180 is an example of the imaging unit. The controller 210 is an example of the subject detector, the setting unit, and the controller.

The embodiments are described above as illustrations of the technique in the present disclosure. For this purpose, the attached drawings and the detailed descriptions are provided.

Therefore, in the constituent elements described in the attached drawings and the detailed descriptions, not only constituent elements essential for solving the problems, but also constituent elements not essential for solving the problems can be included to illustrate the above technique. Therefore, it should not be recognized that the non-essential constituent elements are essential only because the non-essential constituent elements are described in the attached drawings and the detailed descriptions.

Further, because the above embodiments are for illustrating the technique in the present disclosure, it is possible to perform various changes, replacements, additions, and deletions in the claims or within the equivalent range of the claims.

INDUSTRIAL APPLICABILITY

The present disclosure can be applied to an imaging apparatus which controls the focus operation according to the moving speed of the subject. Specifically, the present disclosure can be applied to the imaging apparatus such as, for example, a digital video camera and a digital still camera.

What is claimed is:

1. An imaging apparatus comprising:
an imaging unit including an image sensor configured to capture an image;
a focus motor configured to drive a focus lens; and
a controller configured to
detect a subject from the image captured by the imaging unit,
set, in accordance with a change of a position of the detected subject, an image region to be focused on for the changed position of the subject, and
perform a focus operation to the subject included in the set image region by controlled the focus motor, wherein:
the controller controls a speed of the focus operation by changing a time interval of sampling for performing autofocus AF(auto-focus) control according to a moving speed of the detected subject, or by changing a moving amount of the focus lens per one sampling for performing AF control according to the moving speed of the detected subject;
the sampling for performing AF control is a repeating interval of a predetermined number of frames; and
the controller controls the focus operation to be slower as the moving speed of the detected subject is faster.

2. The imaging apparatus according to claim 1, wherein the controller sets the time interval of the sampling for performing the focus operation to be longer as the moving speed of the detected subject is faster.

3. The imaging apparatus according to claim 1, wherein the controller reduces a moving amount of the focus lens per one sampling to a smaller amount as the moving speed of the detected subject is faster.

4. The imaging apparatus according to claim 1, wherein when the moving speed of the detected subject is faster than a first reference speed, the controller stops the focus operation.

5. The imaging apparatus according to claim 4, wherein when the moving speed of the detected subject becomes slower than a second reference speed after the focus operation is stopped, the controller restarts the focus operation.

* * * * *